(12) United States Patent
Noble

(10) Patent No.: US 7,055,837 B2
(45) Date of Patent: Jun. 6, 2006

(54) STRUT/SHOCK CROSSMEMBER

(76) Inventor: Eric Noble, 217 E. Chapman, Orange, CA (US) 92866

( * ) Notice: Subject to any disclaimer, the term of this patent is extended or adjusted under 35 U.S.C. 154(b) by 335 days.

(21) Appl. No.: 10/730,426

(22) Filed: Dec. 8, 2003

(65) Prior Publication Data

US 2005/0121875 A1   Jun. 9, 2005

(51) Int. Cl.
*B60G 21/05* (2006.01)

(52) U.S. Cl. ............... 280/124.155; 280/124.106; 280/124.109; 280/793

(58) Field of Classification Search ......... 280/124.106, 280/124.109, 124.107, 124.152, 124.147, 280/124.155, 124.166, 785, 793, 794; 296/192, 296/194, 203.2, 203, 187.09; 248/644, 647

See application file for complete search history.

(56) References Cited

U.S. PATENT DOCUMENTS

| | | | | |
|---|---|---|---|---|
| 5,411,311 A | * | 5/1995 | Shimmell et al. | 296/203.02 |
| 5,417,454 A | * | 5/1995 | Adams | 280/794 |
| 6,129,367 A | * | 10/2000 | Bublies et al. | 280/124.107 |

OTHER PUBLICATIONS www.directcarparts.co.uk: E-Tech Strut Braces: Direct Car Parts website p. 1 of 2; Mar. 15, 2004.
www.invoauto.co.uk: Strut Braces & Arms; Invoauto website p. 1 of 1; Mar. 15, 2004.
www.okmiata.com: JR Strut Brace; OK Miata website p. 4-5; Mar. 15, 2004.
www.modacar.com: Subaru—Impreza—Strut Bar / Strutbars; Modacar Auto Accessories website pp. 1-2; Nov. 4, 2003.
www.ompracing.com: OMP Strut braces; OMP Racing website p. 1; Mar. 15, 2004.

* cited by examiner

*Primary Examiner*—Paul N. Dickson
*Assistant Examiner*—Tiffany Webb
(74) *Attorney, Agent, or Firm*—Stetina Brunda Garred & Brucker

(57) ABSTRACT

A crossmember device is provided which is adapted to be installed between a pair of strut/shock towers of a vehicle. The crossmember device includes a left brace and right brace each having an upper, intermediate and lower portion. The left and right brace are interconnected in a X configuration, wherein the center of the interconnection is between the intermediate and lower portions of the left and right brace. A planar body mounting flange provides gusseting structure to interconnect the left and right brace. A strut/shock tower flange assembly is swivel attached to each distal end of the upper portions of the left and right brace.

24 Claims, 4 Drawing Sheets

STRUT/SHOCK CROSSMEMBER

CROSS-REFERENCE TO RELATED APPLICATIONS

STATEMENT RE: FEDERALLY SPONSORED RESEARCH/DEVELOPMENT

BACKGROUND OF THE INVENTION

1. Field of the Invention

The present invention relates to strut and/or shock braces for automobiles. In particular, the present invention relates to a generally vertically or vertically inclined crossmember brace adapted to be positioned between the rear strut and/or shock towers of a vehicle.

2. Background of the Invention

There are numerous aftermarket products available that are designed especially for improving the suspension and chassis of an automobile. One may subtly improve the handling characteristics of a vehicle by simply adding low-profile tires and high-performance struts/shocks. Or, if one desires to transform an automobile into a more aggressively handling vehicle that mimics the handling characteristics of a race car, additional aftermarket components may be installed, such as racing springs, high performance bushings, heavy-duty front and rear anti-sway bars, and strut/shock tower braces for improved chassis stiffness.

Strut/shock braces are easy to install and improve handling by stiffening the span between a pair of suspension struts/shocks. Strut/shock braces are most often used in the front engine compartment of a vehicle. In particular, it is common to provide a brace which spans and "ties" together the front left and right strut/shock of a vehicle. A common brace design provides a pair of flanges adapted to be attached to the top of the strut/shock tower. Both flanges are then interconnected by a rigid bracing member.

Strut/shock braces are utilized to stiffen the chassis or increase body rigidity of a vehicle, which in turn contributes to improved handling characteristics of the vehicle. When a strut/shock brace is attached to the upper portions of the strut/shock towers, the brace stiffens and strengthens the upper body structural region of the vehicle. A stiffer chassis improves steering, improves weight transfer, reduces roll and maximizes handling. Also, a chassis sometimes requires stiffening when tire and or wheel size is increased and when a car is driven aggressively. In this instance, strut/shock braces allow for increased road-handling, reduced tire wear, and improved-shock absorption; especially when used in conjunction with low profile high performance racing tires.

Although there are many prior art examples of strut/shock braces available for "tieing" the front left and right strut/shock towers of a vehicle together, there are relatively few known applications, if any, of a strut/shock brace being utilized between the two rear strut/shock towers of a vehicle. It would be advantageous and desirable to provide a strut/shock brace designed especially for interconnecting or tieing the two rear strut/shock towers of a vehicle together to further enhance the rigidity of vehicle frames.

BRIEF SUMMARY OF THE INVENTION

According to an aspect of the present invention, an adjustable tubular strut/shock crossmember is provided which is adapted to be installed between a pair of suspension strut/shock towers of a vehicle. The strut/shock crossmember is preferably generally vertically oriented or vertically oriented between a pair of rear struts/shocks of a vehicle.

In particular, an embodiment of the crossmember device includes a left brace and right brace each having an upper, intermediate and lower portion. The left and right brace are interconnected in an X configuration, wherein the center of the interconnection is between the intermediate and lower portions of the left and right brace. The crossmember device further includes a planar body mounting flange for providing gusseting structure to connect the left and right brace; and a strut tower flange assembly swivel attached to each distal end of the upper portions of the left and right brace.

According to another aspect of the present invention, the body mounting flange has a main body portion and an X gusset mounting portion connected to the main body by a pair of connecting gusset portions. According to another aspect of the present invention, a void is formed between the pair of connecting gusset portions and between the main body and X gusset connecting portions. Another aspect of the present invention includes the body mounting flange forming an upper gusset between the left and right intermediate portions, a lower gusset between the left and right lower portions, a left gusset between the left intermediate portion and the right lower portion, and a right gusset between the right intermediate portion and the left lower portion.

According to another embodiment of the present invention, a strut/shock tower flange assembly is provided having a flat circular flange with a plurality of mounting holes disposed therein, and a pair of brackets spanning the circular flange. The pair of brackets are oriented parallel to each other, and inclined at an angle toward one side of the circular flange. Each of the brackets have an integrally formed elbow which is offset to one side of the bracket and of which is projecting upwardly. Each of the brackets has a mounting hole disposed within each elbow such that swivel attachment hardware may be installed therethrough.

And yet another embodiment of the present invention includes an adjustable coupler installed on each of the left and right brace for adjusting the length of the left and right brace. Additionally, in another aspect of the present invention the left and right braces are formed from round tubing. In another aspect of the present invention, an obtuse angle $\theta$ is formed between the intermediate portions of the left and right brace.

Additionally, another embodiment of the present invention is provided in which the aforementioned crossmember device is installed into a vehicle having a pair of strut/shocks mounted within a pair of strut/shock towers. According to another aspect of the present invention, the pair of strut/shock towers are located in the rear of the vehicle. Another aspect of the present invention includes the crossmember device is mounted to an upper portion of the pair of strut/shock towers and to the lower body of the vehicle.

Moreover, a further aspect of the present invention includes the crossmember device transversely oriented between the pair of strut/shock towers, and generally vertically oriented with respect to one of a trunk floor or lower body floor of the vehicle. Furthermore, an additional aspect of the present invention may include the crossmember device transversely oriented between the pair of strut/shock towers, and generally vertically inclined with respect to one of a trunk floor or lower body floor of the vehicle.

According to other aspects of the present invention, the main body of the mounting flange is conformally attached to a portion of the lower body of the vehicle. In another aspect of the present invention, no modifications are required on the vehicle to install the crossmember device. Additionally, the crossmember device may be positioned contiguously and laterally next to a backside of a rear seat of the vehicle such that trunk spaced remains unobstructed. Moreover, according to another aspect of the present invention, when the crossmember device is installed in the vehicle, the stiffness of the vehicle chassis is increased, and as a result, the handling of the vehicle is improved. Furthermore, according to another aspect of the present invention, the crossmember device is positioned contiguously and laterally next to a cabin-to-trunk body bulkhead of the vehicle.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Overview of the Present Invention

Figure 3:
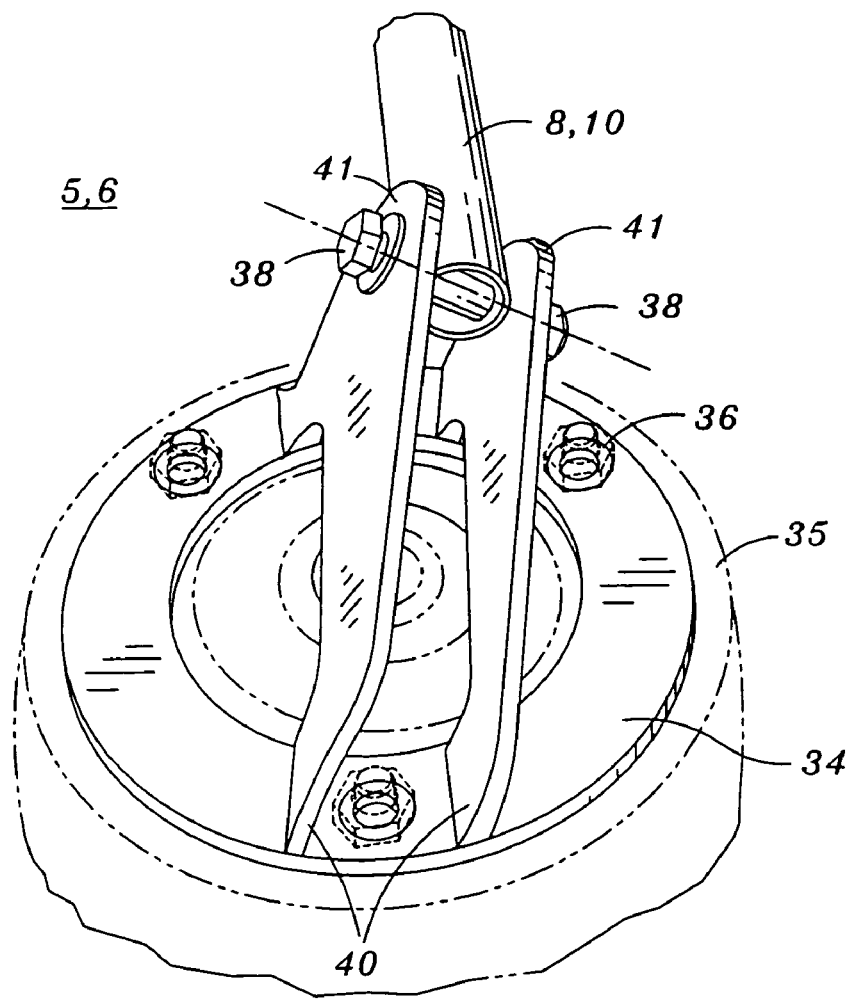
FIG. 3 is a perspective view of a strut/shock tower flange assembly, according to an aspect of the present invention.

An exemplary embodiment of an adjustable tubular strut/shock crossmember device 2 (see FIG. 1) is provided which is adapted to be installed between a pair of suspension strut or shock towers 35 from a vehicle (see FIG. 3). The strut/shock crossmember 2 is preferably oriented in one of a generally vertical orientation or in a vertically inclined position between a pair of rear struts/shocks of a vehicle.

The present invention improves the suspension and chassis of a vehicle. The crossmember device 2 is easy to install and improves handling by stiffening the span between the pair of suspension struts/shocks. Since crossmember device 2 stiffens the chassis and increases body rigidity of the vehicle, the handling characteristics of the vehicle are greatly improved so that drivers can enjoy superb response and handling. When the crossmember device 2 is attached to the upper portions of strut/shock towers 35, the crossmember device 2 stiffens and strengthens the upper body structure of the vehicle. By stiffening the chassis of the vehicle, steering and weight transfer is improved, and roll is reduced.

Description of the Exemplary Strut Tower Crossmember

Figure 1:
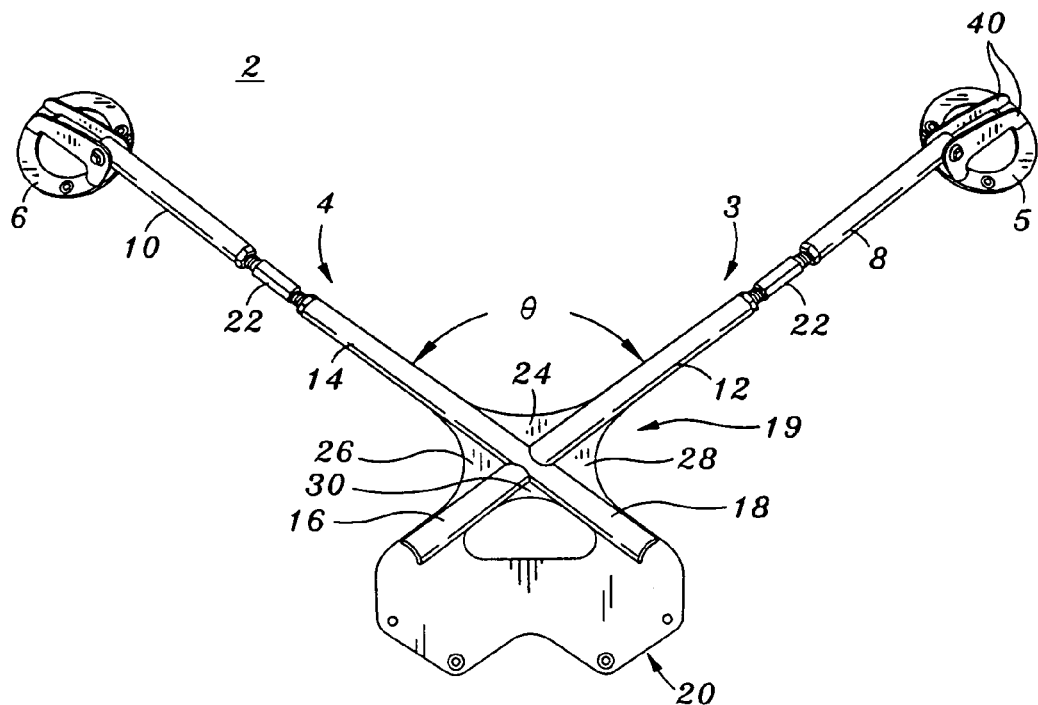
FIG. 1 depicts an exemplary embodiment a strut/shock crossmember for a vehicle, according to an aspect of the present invention.

FIG. 1 illustrates an exemplary embodiment of the present invention. The strut/shock crossmember 2 comprises a tubular left brace 3 and tubular right brace 4 which are interconnected in an X-shaped orientation. A body mounting flange 20 comprising a planar member acts as a gusseting brace at the X-shaped interconnection 19. Left and right strut/shock tower flange assemblies 5, 6 are attached to both distal ends of the left and right brace 3, 4. The aforementioned components are now described in further detail below.

The braces 3, 4 are preferably made from round metal tubing, such as a high-strength low weight alloy. The left brace 3 includes a left upper portion 8 connected to a left intermediate portion 12 by an adjustable coupling 22. The left brace 3 further includes a lower left portion 16 which may be either a continuous extension of the intermediate portion 12, or may be a separate tubular portion. In a similar arrangement, the right brace 4 includes a right upper portion 10 connected to a right intermediate portion 14 by an adjustable coupling 22. The right brace 4 further includes a lower right portion 18 which may be either a continuous extension of the intermediate portion 14, or is a separate tubular portion. The X-shaped interconnection 19 of left and right braces 3, 4 is facilitated by body mounting flange 20 which may be described in further detail below.

Figure 2:
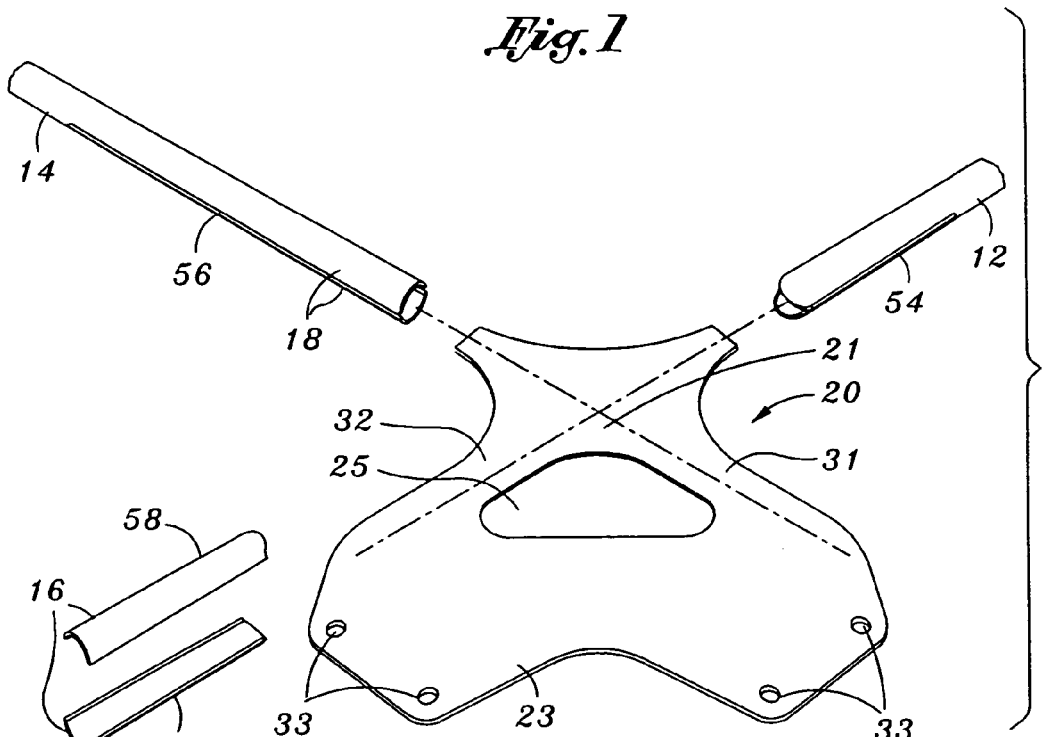
FIG. 2 is an exploded detail view of the body mounting flange, according to an aspect of the present invention.

FIG. 2 is an exploded detail view of the body mounting flange 20, according to an aspect of the present invention. A function of the body mounting flange 20 is to structurally tie or interconnect the left and right brace 3, 4 together, while simultaneously providing a flange that is adapted to be attached to the lower body 47 of the vehicle (see FIGS. 5 through 8). The preferred embodiment of body mounting flange 20 is depicted in FIG. 2, however, it is recognized that body mounting flange 20 may be formed or shaped in a variety of equivalent structures well known in the art that perform the same function. In the preferred embodiment, a one piece metal plate is provided having a main body portion 23 and an X-interconnection portion 21. The main body portion 23 is be adapted to conformally fit to a surface of the lower body 47 of the vehicle. The X-interconnection portion 21 is connected to the main body portion 23 by left connecting gusset portion 31 and right connecting gusset 32 such that a void 25 is formed between the left and right gusset portions 31, 32.

In the preferred embodiment, the forming of the X-shaped interconnection 19 of the left and right brace 3, 4 in conjunction with mounting flange 20 is facilitated by providing receiving slots 54, 56 in the left intermediate portion 12 and right intermediate portion 14. One of the intermediate portions 12, 14 may be further separated into individual pieces including an upper half-pipe 58 and lower half-pipe 60. The X-shaped interconnection 19 is assembled by sliding the X gusset portion 21 of the body mounting flange 20 into the respective receiving slots 54, 56 of the left and right intermediate portions 12, 14 such that the X-shaped interconnection 19 has a desired angle of θ (see FIG. 1). The left and right intermediate portions 12, 14 are then preferably welded to the body mounting flange 20 to form a unitary structure. Further, upper half-pipe 58 and lower half-pipe 60 portions may then be positioned in an longitudinally extending manner from the respective intermediate portion (left portion 14 in the exemplary embodiment) and also welded to the body mounting flange 20 to finish the assembly of the X-shaped interconnection 19.

FIG. 3 is a perspective view of a strut/shock tower flange assembly 5, 6, which may be swivel attached to the distal ends of left and right braces 3, 4, according to an aspect of the present invention. Each flange assembly 5, 6 includes a circular flange 34 which is adapted to be bolted directly to the top of a strut/shock tower 35 of the vehicle. A plurality of bolt holes 36 are disposed in the circular flange 34 in a bolt pattern which preferably matches existing upper strut/shock assembly fastening hardware, such that the circular flange 34 may be directly attached to the top of the strut tower 35 utilizing existing fastening hardware already in-place. A pair of flange brackets 40 are mounted (e.g., welded) to the circular flange 34 such that they substantially span the circular flange 34. The pair of brackets 40 are oriented such that they are in parallel with each other, and furthermore, such that both brackets 40 are inclined at an angle towards one side of the circular flange 34. Each bracket 40 may have an integrally formed elbow 41 which is offset to one side of the bracket 40 and of which is upwardly projecting. Mounting holes are disposed within each elbow 41 such that swivel attachment hardware 38 may be installed therethrough. Additionally, each distal end of the left and right upper portions 8, 10 of braces 3, 4 are disposed with receiving bores to rotatably receive the swivel attachment hardware 38.

Figure 4:
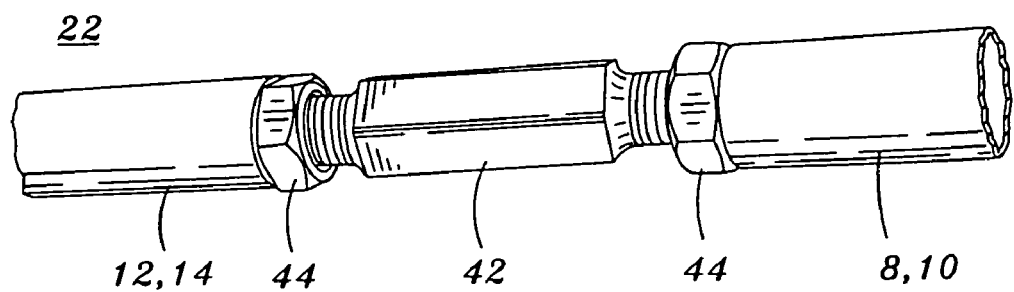
FIG. 4 is a detail view of an adjustable coupling installed on each of the left and right upper portions of the strut/shock crossmember, according to an aspect of the present invention.

FIG. 4 is a detail view of the adjustable couplings 22 utilized to longitudinally connect the upper portions 8, 10 to the intermediate portions 12, 14 of the braces 3, 4. Adjustable couplings 22 perform at least couple of functions including providing adjustability during fitment of the strut/shock crossmember 2 into the vehicle, and to further adjust the tension or compression in each brace 3, 4 after the crossmember 2 has been installed into the vehicle. The preferred embodiment of adjustable coupling 22 is depicted in FIG. 4, however, it is recognized that the adjustable coupling 22 may be provided in a variety of adjustable and articulatable device known in the art that perform the same function. In the preferred embodiment, adjustable coupling 22 includes an adjustment lug 42 which has a pair of threaded ends disposed on each end. On each connecting end of left and right intermediate portion 12, 14 and the left and right upper portions 8, 10, threaded fittings 44 are incorporated to receive the threaded ends of adjustment lug 42. When adjustment lug 42 is installed into threaded fittings 44, the intermediate portions 12, 14 and upper portions 8, 10 become unitary assemblies, respectively.

Description of the Installation the Exemplary Strut Tower Crossmember

The strut/shock crossmember 2 maybe installed on any vehicle which utilizes a pair of suspension struts or shocks (left and right) which have a generally unobstructed space or span between each the respective pair of strut or shock towers. A first installation scenario involves utilizing the crossmember 2 between two rear struts/shocks of a vehicle which has a conventional rear trunk area. A second installation scenario may involve utilizing the crossmember 2 between two front struts/shocks in the front trunk of a rear engine vehicle. Other installations are possible for any other vehicle which utilizes strut/shock towers and of which are separated by a span.

Figure 5:
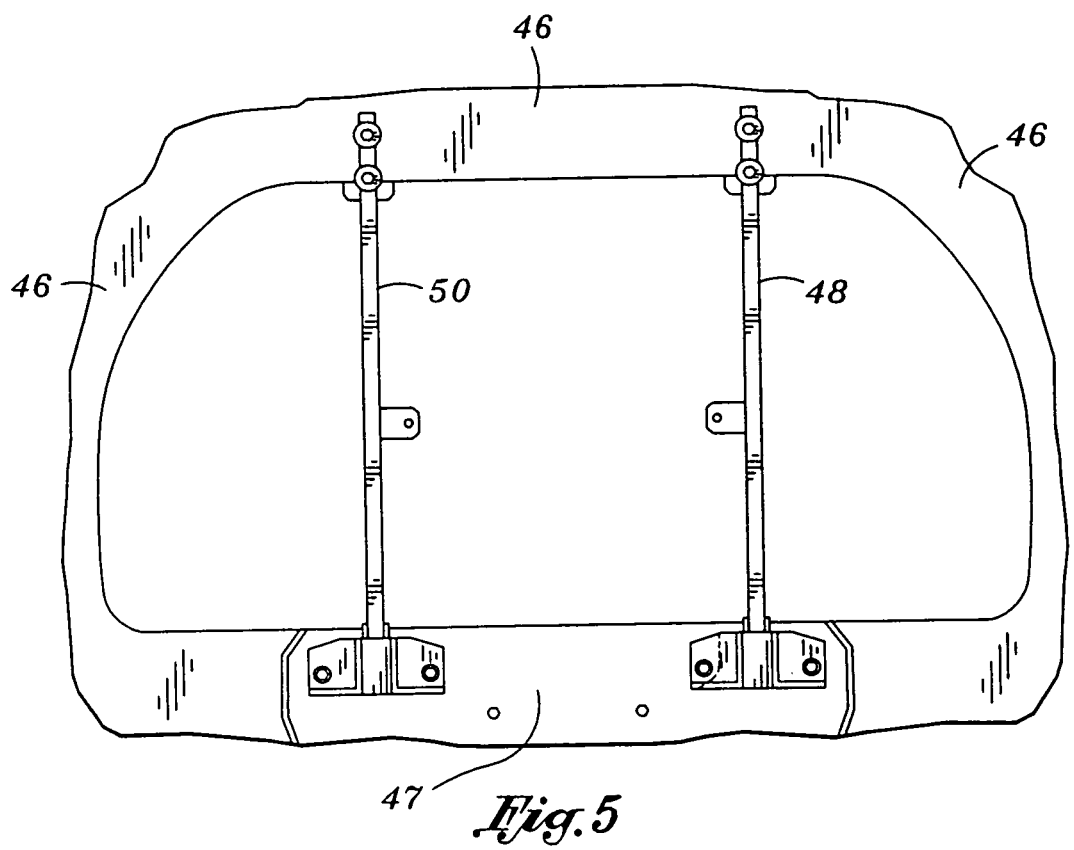
FIG. 5 is an illustration depicting the cabin-to-trunk body bulkhead as viewed from the passenger's compartment of a vehicle.
Figure 6:
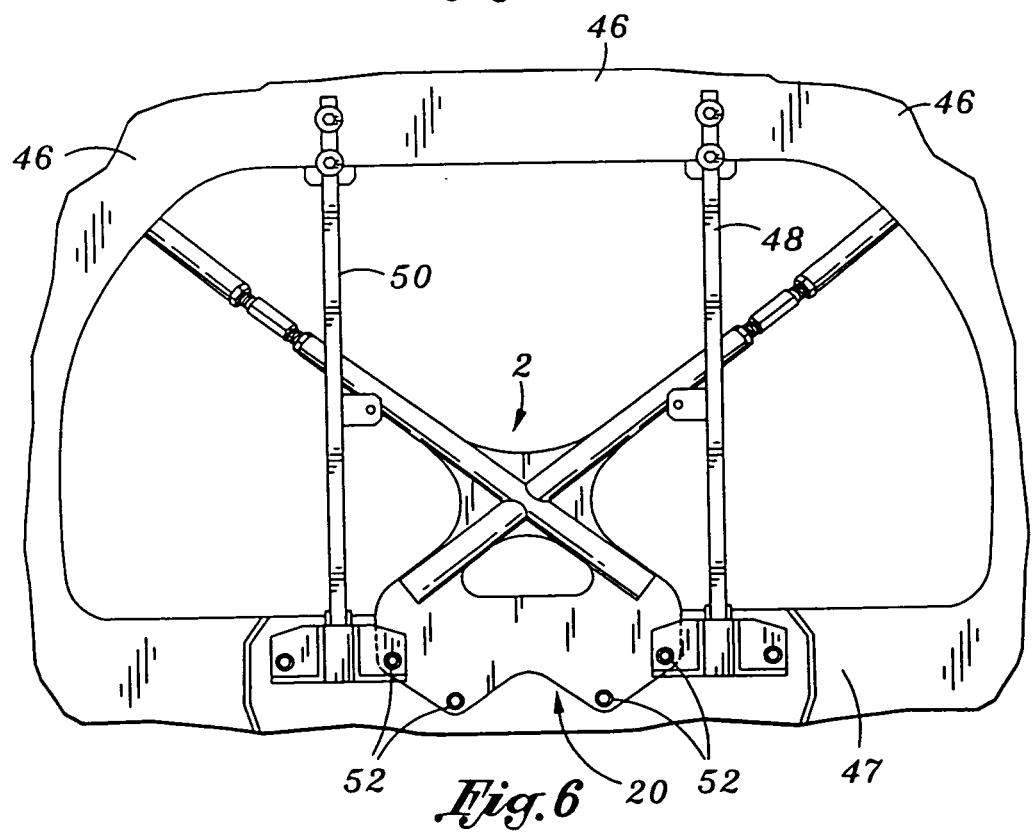
FIG. 6 is an illustration depicting the cabin-to-trunk body bulkhead as viewed from the passenger's compartment of the vehicle with a strut/shock crossmember installed, according to an aspect of the present invention.
Figure 7:
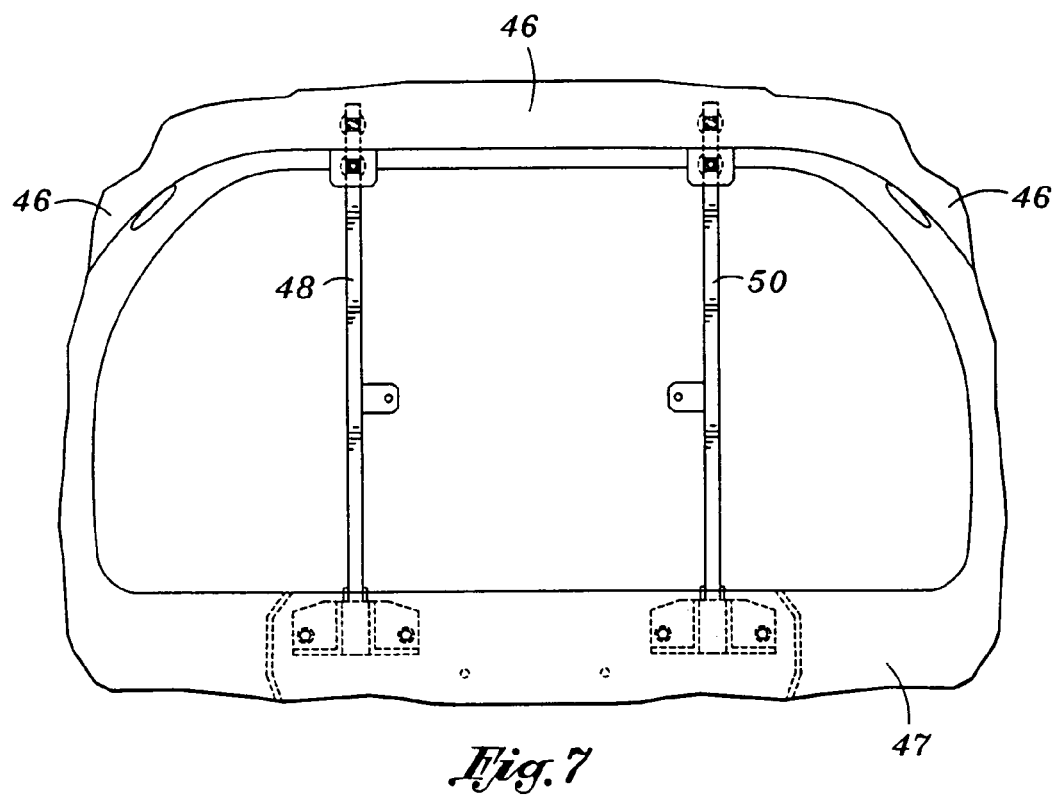
FIG. 7 is an illustration depicting the cabin-to-trunk body bulkhead as viewed from the trunk of the vehicle.

An exemplary installation of the strut/shock crossmember 2 is illustrated in FIGS. 5 through 8. FIG. 5 is an illustration depicting a typical cabin-to-trunk body bulkhead 46 as viewed from the passenger's compartment of a vehicle with the rear seat removed. While FIG. 7 is an illustration depicting the cabin-to-trunk body bulkhead 46 as viewed from the trunk of the vehicle with the rear seat removed.

Figure 8:
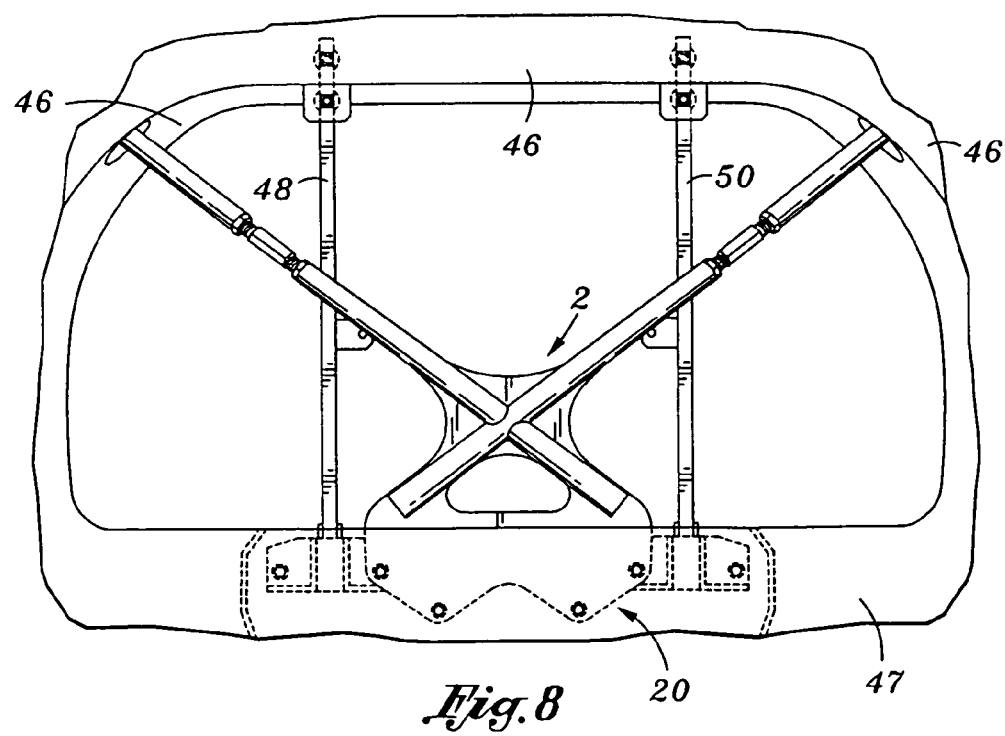
FIG. 8 is an illustration depicting the cabin-to-trunk body bulkhead as viewed from the trunk of the vehicle with the strut/shock crossmember installed, according to an aspect of the present invention.

FIG. 6 is an illustration depicting the cabin-to-trunk body bulkhead 46 as viewed from the passenger's compartment of a vehicle with a strut/shock crossmember 2 installed in the vehicle, according to an aspect of the present invention. Body mounting flange 20 is shown to be conformally fit and attached to the lower body 47 of the vehicle using fastening hardware 52. The mounting flange 20 is preferably configured and formed such that that it may be directly bolted to the lower body 47 of the vehicle utilizing existing fastening holes such that drilling additional holes into the lower body 47 may not be required. FIG. 8 is an illustration depicting the cabin-to-trunk body bulkhead 46 as viewed from the trunk of the vehicle with a strut/shock crossmember 2 installed in the vehicle. The left and right strut/shock tower flange assemblies 5, 6 are secured to the upper portion 35 of strut towers of the vehicle with preferably existing in-place fastening hardware, as previously discussed. Furthermore, when installing the crossmember 2, the adjustable couplings 22 may be adjusted to provide additional length to or to shorten the left and right braces 3, 4. It is further noted that the strut crossmember 2 is designed such that it does not obstruct or interfere with the installation of the rear vehicle seat. Nor does the installation of crossmember 2 interfere with or obstruct the space in the trunk.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and such uses are within the scope of the appended claims.

What is claimed is:

1. A crossmember device adapted to be installed between a pair of strut/shock towers of a vehicle, the device comprising:
    a left brace and right brace each having an upper, intermediate and lower portion, said left and right brace interconnected in a X-configuration, wherein the center of the interconnection is between said intermediate and said lower portions of said left and right brace;
    a planar body mounting flange for providing gusseting structure to interconnect said left and right brace; and a strut/shock tower flange assembly swivel attached to each distal end of said upper portions of said left and right brace.

2. The device according to claim 1, said body mounting flange having a main body portion and an X gusset mounting portion connected to said main body by a pair of connecting gusset portions.

3. The device according to claim 2, wherein a void is formed between said pair of connecting gusset portions and between said main body and X gusset mounting portion.

4. The device according to claim 3, said body mounting flange forming an upper gusset between said left and right intermediate portions, a lower gusset between said left and right lower portions, a left gusset between said left intermediate portion and said right lower portion, and a right gusset between said right intermediate portion and said left lower portion.

5. The device according to claim 1, said strut/shock tower flange assembly comprising,
   a circular flange having a plurality of mounting holes disposed therein, and
   a pair of brackets spanning said circular flange, said pair of brackets oriented parallel to each other, and inclined at an angle toward one side of said circular flange, each of said brackets having an integrally formed elbow offset to one side of said bracket and projecting upwardly, each of said brackets having a mounting hole disposed within each elbow such that swivel attachment hardware may be installed therethrough.

6. The device according to claim 1, further comprising an adjustable coupler installed on each of said left and right brace for adjusting the respective length of said left and right brace.

7. The device according to claim 1, wherein said left and right brace comprise round tubing.

8. The device according to claim 1, wherein an obtuse angle θ is formed between said intermediate portions of said left and right brace.

9. A crossmember device, in combination with a vehicle having a pair of strut/shocks installed into a pair of strut/shock towers, the device comprising:
   a left brace and right brace each having an upper, intermediate and lower portion, said left and right brace interconnected in a X configuration, wherein the center of the interconnection is between the said intermediate and said lower portions of said left and right brace;
   a planar body mounting flange for providing gusseting structure to interconnect said left and right brace; and
   a strut/shock tower flange assembly swivel attached to each distal end of said upper portions of said left and right brace.

10. The device in combination with said vehicle according to claim 9, said body mounting flange having a main body portion and X gusset mounting portion, said X gusset mounting portion connected to said main body portion by a pair of connecting gusset portions.

11. The device in combination with said vehicle according to claim 10, wherein a void is formed between said pair of connecting gusset portions and between said main body and X gusset connecting portions.

12. The device in combination with said vehicle according to claim 11, said body mounting flange forming an upper gusset between said left and right intermediate portions, a lower gusset between said left and right lower portions, a left gusset between said left intermediate portion and said right lower portion, and a right gusset between said right intermediate portion and said left lower portion.

13. The device in combination with said vehicle according to claim 9, said strut/shock tower flange assembly comprising,
   a circular flange having a plurality of mounting holes disposed therein, and
   a pair of brackets spanning said circular flange, said pair of brackets oriented parallel to each other, and inclined at an angle toward one side of said circular flange, each of said brackets having an integrally formed elbow offset to one side of said bracket and of upwardly projecting, each of said brackets having a mounting hole disposed within each elbow such that swivel attachment hardware may be installed therethrough.

14. The device in combination with said vehicle according to claim 9, further comprising an adjustable coupler installed on said left and right brace for adjusting the length of said left and right brace.

15. The device in combination with said vehicle according to claim 9, wherein said pair of strut/shock towers are located in the rear of said vehicle.

16. The device in combination with said vehicle according to claim 15, said crossmember device mounted to an upper portion of said pair of strut/shock towers and to a lower body of a vehicle.

17. The device in combination with said vehicle according to claim 16, said crossmember device transversely oriented between said pair of strut/shock towers, and generally vertically oriented with respect to one of a trunk floor or lower body floor of said vehicle.

18. The device in combination with said vehicle according to claim 16, said crossmember device transversely oriented between said pair of strut/shock towers, and generally vertically inclined with respect to one of a trunk floor or lower body floor of said vehicle.

19. The device in combination with said vehicle according to claim 16, wherein said a main body of said mounting flange is conformally attached to a portion of said lower body of said vehicle.

20. The device in combination with said vehicle according to claim 16, wherein said crossmember device is positioned contiguously and laterally next to a backside of a rear seat of said vehicle such that trunk spaced remains unobstructed.

21. The device in combination with the vehicle according to claim 9, wherein said left and right braces comprise round tubing.

22. The device in combination with said vehicle according to claim 9, wherein an obtuse angle θ is formed between said intermediate portions of said left and right brace.

23. The device in combination with said vehicle according to claim 9, wherein no modifications are required on said vehicle to install said crossmember device.

24. The device in combination with said vehicle according to claim 9, wherein said crossmember device is positioned contiguously and laterally next to a cabin-to-trunk body bulkhead of said vehicle.

* * * * *